United States Patent
Zhou

(10) Patent No.: US 8,166,318 B2
(45) Date of Patent: Apr. 24, 2012

(54) POWER CIRCUIT

(75) Inventor: Hai-Qing Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 178 days.

(21) Appl. No.: 12/790,969

(22) Filed: May 31, 2010

(65) Prior Publication Data

US 2011/0225435 A1    Sep. 15, 2011

(30) Foreign Application Priority Data

Mar. 11, 2010    (CN) .......................... 2010 1 0122034

(51) Int. Cl.
*H02M 3/335*    (2006.01)
*G06F 1/00*    (2006.01)

(52) U.S. Cl. ............ 713/300; 330/85; 330/260; 331/17; 361/93.7; 363/14; 363/15

(58) Field of Classification Search .................. 713/300; 330/85, 260; 331/17; 361/93.7; 363/14, 363/15

See application file for complete search history.

(56) References Cited

U.S. PATENT DOCUMENTS

| | | | | |
|---|---|---|---|---|
| 4,520,283 A * | 5/1985 | Sasaki et al. | ................... | 327/557 |
| 4,558,292 A * | 12/1985 | Sasaki et al. | ................... | 333/173 |
| 4,629,852 A * | 12/1986 | Andre | ........................... | 219/497 |
| 4,885,796 A * | 12/1989 | Loftus et al. | .................. | 455/11.1 |
| 5,008,753 A * | 4/1991 | Kitaura et al. | ................. | 348/695 |
| 5,198,728 A * | 3/1993 | Bernitz et al. | ................. | 315/307 |
| 6,700,432 B2 * | 3/2004 | Misdom et al. | ................ | 327/419 |
| 6,816,009 B2 * | 11/2004 | Hughes et al. | ................... | 330/85 |
| 7,622,898 B2 * | 11/2009 | Shimizu et al. | ................. | 320/166 |
| 7,629,854 B2 * | 12/2009 | Lin et al. | ......................... | 331/17 |
| 7,898,191 B2 * | 3/2011 | Hamamoto et al. | .......... | 315/307 |
| 7,898,333 B2 * | 3/2011 | Griffith et al. | ................ | 330/260 |
| 2010/0265742 A1 * | 10/2010 | Hu et al. | ..................... | 363/21.13 |

* cited by examiner

Primary Examiner — M Elamin

(74) Attorney, Agent, or Firm — Altis Law Group, Inc.

(57) ABSTRACT

A power circuit includes a memory power circuit and a central processing unit (CPU) power circuit. The memory power circuit includes a first operational amplifier and a first switch. The CPU power circuit includes a second operational amplifier and a second switch. The memory power circuit supplies power to a memory slot. The CPU power circuit supplies power to a CPU.

6 Claims, 1 Drawing Sheet

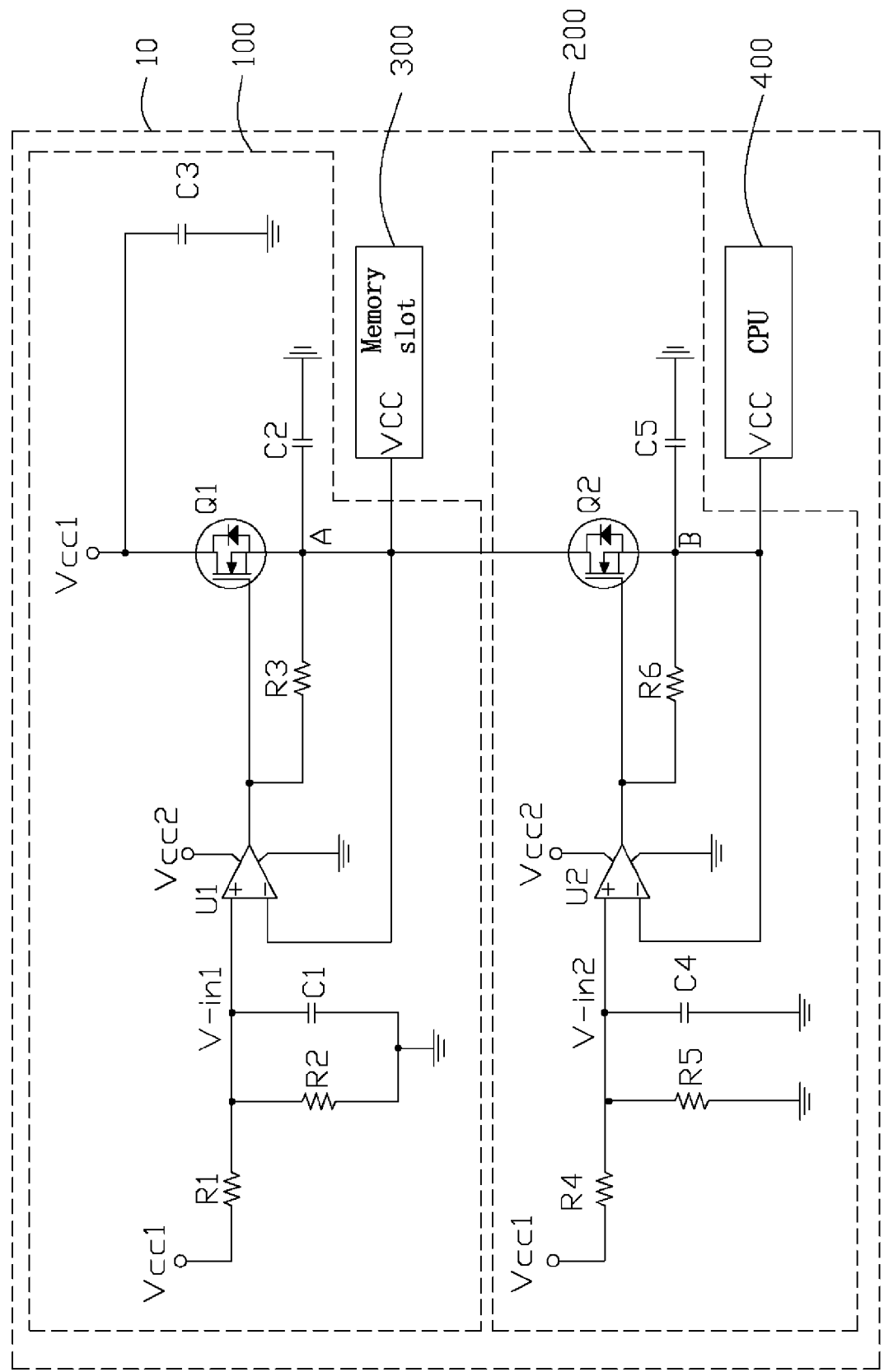

POWER CIRCUIT

BACKGROUND

1. Technical Field

The present disclosure relates to a power circuit.

2. Description of Related Art

On some motherboards, power circuitry for memory chips are separated from power circuitry for the central processing unit (CPU). This is because the memory chips and the CPU runs on different voltages, that is, some memory chips runs on 2.5 volts(V) and the CPU runs on 1.5V. However, having separate power circuitry on different areas of the motherboard will involve duplication of some components. This increases the cost of the motherboard. Therefore there is room for improvement in the art.

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present embodiments. Moreover, in the drawing, all the views are schematic, and like reference numerals designate corresponding parts throughout.

The FIGURE is a circuit diagram of an exemplary embodiment of a power circuit.

DETAILED DESCRIPTION

The disclosure, including accompanying drawing in which like references indicate similar elements, is illustrated by way of example and not by way of limitation. It should be noted that references to "an" or "one" embodiment in this disclosure are not necessarily to the same embodiment, and such references mean at least one.

Referring to the drawing, an exemplary embodiment of a power circuit is arranged on a motherboard 10. The power circuit includes a memory power circuit 100 and a central processing unit (CPU) power circuit 200.

The circuit 100 includes a first operational amplifier U1, a first switch, resistors R1-R3, and capacitors C1-C3. In the embodiment, the first switch is a metal-oxide-semiconductor field effect transistor (MOSFET) Q1.

A non-inverting input of the first operational amplifier U1 is connected to a first power source Vcc1 via the resistor R1, and grounded via the resistor R2 and the capacitor C1 in parallel. An inverting input of the first operational amplifier U1 is grounded via the capacitor C2. An output of the first operational amplifier U1 is connected to the inverting input of the first operational amplifier U1 via the resistor R3. A power terminal of the first operational amplifier U1 is connected to a second power source Vcc2. A ground terminal of the first operational amplifier U1 is grounded.

A drain of the MOSFET Q1 is connected to the first power source Vcc1, and grounded via capacitor C3. A gate of the MOSFET Q1 is connected to the output of the first operational amplifier U1. A source of the MOSFET Q1 is connected to a node A between the resistor R3 and the capacitor C2. A power terminal VCC of a memory slot 300 of the motherboard 10 is connected to the node A.

The relationship between the voltage V-in1 of the non-inverting input of the first operational amplifier U1, the voltage of the first power source Vcc1, and resistances of the resistors R1 and R2 is shown below.

$$V\text{-}in1 = Vcc1 \times R2/(R1+R2)$$

The voltage of the first power source Vcc1 is 3.3 volts (V). The resistances of R1 and R2 are such that the voltage V-in1 of the non-inverting input of the first operational amplifier U1 is 2.5V. The voltage at the output of the first operational amplifier U1 turns on the MOSFET Q1. The first operational amplifier U1 and the resistor R3 compose a deep negative feedback circuit. The voltage of the inverting input of the first operational amplifier U1 is equal to the voltage V-in1 of the non-inverting input of the first operational amplifier U1. Therefore, the voltage of the node A is 2.5V. The memory power circuit 100 supplies power to the memory slot 300 via the power terminal VCC of the memory slot 300.

The CPU power circuit 200 includes a second operational amplifier U2, a second switch, resistors R4-R6, and capacitors C4 and C5. In the embodiment, the second switch is a MOSFET Q2.

A non-inverting input of the second operational amplifier U2 is connected to the first power source Vcc1 via the resistor R4, and grounded via the resistor R5 and the capacitor C4 in parallel. An inverting input of the second operational amplifier U2 is grounded via the capacitor C5. An output of the second operational amplifier U2 is connected to the inverting input of the second operation amplifier U2 via the resistor R6. A power terminal of the second operational amplifier U2 is connected to the second power source Vcc2. A ground terminal of the second operational amplifier U2 is grounded.

A drain of the MOSFET Q2 is connected to the node A of the memory power circuit 100. A gate of the MOSFET Q2 is connected to the output of the second operational amplifier U2. A source of the MOSFET Q2 is connected to a node B between the resistor R6 and the capacitor C5. A power terminal VCC of a CPU 400 of the motherboard 10 is connected to the node B.

The relationship between the voltage V-in2 of the non-inverting input of the second operational amplifier U2, the voltage of the first power source Vcc1, and resistances of the resistors R4 and R5 is shown below.

$$V\text{-}in2 = Vcc1 \times R5/(R4+R5)$$

The resistances of R4 and R5 are such that the voltage V-in2 of the non-inverting input of the second operational amplifier U2 is 1.5V. The output of the second operational amplifier U2 is at a high voltage level. The MOSFET Q2 is turned on. The second operational amplifier U2 and the resistor R6 compose a deep negative feedback circuit. The voltage of the inverting input of the second operational amplifier U2 is equal to the voltage V-in2 of the non-inverting input of the second operational amplifier U2. Therefore, the voltage of the node B is 1.5V. The CPU power circuit 200 supplies power to the CPU 400 via the power terminal VCC of the CPU 400.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A power circuit, comprising:

a memory power circuit comprising a first operational amplifier and a first switch, wherein a non-inverting input of the first operational amplifier is connected to a first power source via a first resistor, and grounded via a second resistor, an inverting input of the first operational amplifier is grounded via a first capacitor, an output of the first operational amplifier is connected to the inverting input of the first operation amplifier via a third resistor, a first terminal of the first switch is connected to the first power source, a second terminal of the first switch is connected to the output of the first operational amplifier, a third terminal of the first switch is connected to a first node between the third resistor and the first capacitor, the first node is connected to a power terminal of a memory slot; and a central processing unit (CPU) power circuit comprising a second operational amplifier and a second switch, wherein a non-inverting input of the second operational amplifier is connected to the first power source via a fourth resistor, and grounded via a fifth resistor, an inverting input of the second operational amplifier is grounded via a second capacitor, an output of the second operational amplifier is connected to the inverting input of the second operational amplifier via a sixth resistor, a first terminal of the second switch is connected to the first node between the third resistor and the first capacitor, a second terminal of the second switch is connected to the output of the second operational amplifier, a third terminal of the second switch is connected to a second node between the sixth resistor and the second capacitor, the second node is connected to a power terminal of a CPU.

2. The power circuit of claim 1, wherein the first switch is a metal-oxide-semiconductor field effect transistor (MOSFET), a drain of the MOSFET functions as the first terminal of the first switch, a gate of the MOSFET functions as the second terminal of the first switch, a source of the MOSFET functions as the third terminal of the first switch.

3. The power circuit of claim 1, wherein the second switch is a metal-oxide-semiconductor field effect transistor (MOSFET), a drain of the MOSFET functions as the first terminal of the second switch, a gate of the MOSFET functions as the second terminal of the second switch, a source of the MOSFET functions as the third terminal of the second switch.

4. The power circuit of claim 1, wherein the memory power circuit further comprises a third capacitor, the non-inverting input of the first operational amplifier is grounded via the third capacitor.

5. The power circuit of claim 1, wherein the memory power circuit further comprises a third capacitor, the first terminal of the first switch is grounded via the third capacitor.

6. The power circuit of claim 1, wherein the CPU power circuit further comprises a third capacitor, the non-inverting input of the second operational amplifier is grounded via the third capacitor.

* * * * *